United States Patent Office 2,937,178
Patented May 17, 1960

2,937,178

REMOVAL OF ALKALI METAL IMPURITIES FROM LIQUID DIENE POLYMERS

Paul F. Warner, Phillips, Tex., assignor to Phillips Petroleum Company, a corporation of Delaware No Drawing. Application October 30, 1958
Serial No. 770,581

10 Claims. (Cl. 260—290)

This invention relates to the removal of alkali metal impurities from liquid diene polymers.

Patent No. 2,631,175 discloses a polymerization process whereby liquid diene polymers are prepared using alkali metals as polymerization catalysts. The products produced by this process have considerable utility but further work has disclosed possibilities for improvements in the commercial operation of the process.

In the alkali metal polymerization of conjugated dienes and the like, it is necessary to treat the resulting reaction mixture in some manner to convert the alkali metal and reactive alkali metal organic compounds present to prevent further catalytic effect of the alkali metal on the product. Alkali metal catalysts are harmful if left in the product because they promote cross-linking of the polymer with concomitant formation of gel. Alkali metal hydroxides left in the polymers are deleterious for many uses of such polymers. For instance, a liquid polymer, which is to be incorporated in low plasticity synthetic rubber for improving its processing characteristics, will impart too fast a curing rate of a compound of said rubber if it contains alkali metal hydroxides. A liquid polymer which is to be used as a drying oil should not contain any substantial amount of alkali metal or alkali metal compounds as these tend to render the liquid cloudy and cause undesirable reactions when compounding these oils in paints, various types of varnishes and protective surface coatings and adhesive formulations.

By the term "alkali metal impurities," employed herein, it is meant to include free alkali metal and/or organo alkali metal compounds formed during the polymerization and present in the polymer product, and also organo alkali metal compounds employed as catalysts, such as sodium butyl, sodium triphenyl methyl, and the like, and alkali metal hydrides. These latter compounds are exemplary of catalysts within the group consisting of the alkali metals, the alkali metal hydrides, the alkali metal alkyls, and the alkali metal aryls. Any of the above-mentioned type materials, i.e., free alkali metals such as sodium, potassium, or lithium, and/or the defined organo alkali metal compounds, when present in the polymer product comprise the said "alkali metal impurities," removed from the polymer in accordance with this invention.

The present invention is directed to a process for recovering a substantially catalyst free product, either as a solution of the polymer in an organic solvent or as the liquid polymer free of solvent. It has long been known that contacting the polymerization zone effluent with an alcohol results in deactivation of the catalyst. Alcohols known in the art for such treatment include, preferably, those containing up to four carbon atoms per molecule such as methyl alcohol, ethyl alcohol, the propyl alcohols, the butyl alcohols, propylene glycol and butylene glycol. According to prior art processes, it has been common to treat the polymer, following treatment with the alcohol, in a water washing step. Such water washing produces a substantially catalyst-free product but, in some cases, leads to the formation of emulsions which reduce the ultimate yield of product. Furthermore, the presence of even trace amounts of water is deleterious to filtration rates and to the ash content of the finished polymer.

Broadly, the present invention is directed to treatment of the polymers commonly, the process being practiced on the reaction zone effluent, by a method which does not involve the use of water.

The method of the present invention comprises treating the liquid polymer with an alcohol and with a halide of calcium, zinc, or iron, this combination treatment resulting in the formation of a precipitate which can be removed from the liquid polymer.

The following are objects of this invention.

An object of this invention is to provide alkali metal free liquid polymers of conjugated diolefins. A further object of this invention is to provide a process for removing alkali metal impurities from liquid polymers of conjugated dienes. A further object of this invention is to provide a process for the removal of alkali metal impurities from homopolymers of 1,3-butadiene and copolymers of 1,3-butadiene and 2-methyl-5-vinylpyridine.

Other objects and advantages of this invention will be apparent to one skilled in the art upon reading this disclosure.

As stated, the present invention relates to liquid polymers of conjugated dienes prepared according to the method disclosed in Patent No. 2,631,175. As shown in said patent, the alkali metals can be used to produce liquid polymers of good quality, said polymers having a viscosity in the range of 100 to 6,000 Saybolt Furol seconds at 100° F. The polymers include homopolymers of conjugated dienes containing 4 to 8 carbon atoms, those containing 4 to 6 carbon atoms being preferred. Representative conjugated dienes include 1,3-butadiene, isoprene, piperylene, 2-methyl-1,3-pentadiene, 2,3-dimethyl-1,3-butadiene, 2-methyl-1,3-hexadiene, and 1,3-octadiene. Various vinyldiene containing comonomers can be used in combination with the conjugated diene, these including, for example, styrene, vinyl chloride, acrylonitrile, methyl vinyl ether, and the like. A group of copolymers of current interest are those prepared by polymerizing a major amount of a conjugated diene as above defined and a copolymerizable heterocyclic nitrogen base.

The heterocyclic nitrogen bases which are applicable are those of the pyridine and quinoline series which are copolymerizable with a conjugated diene and contain one

substituent wherein R is either hydrogen or a methyl group, i.e., the substituent is either a vinyl or an alpha-methyl-vinyl (isopropenyl) group. The vinyl-substituted heterocyclic nitrogen bases of the pyridine and quinoline series which are preferred are those having only one

substituent and of these compounds, those belonging to the pyridine series are most frequently used. Various derivatives can also be used but it is generally preferred that the total number of carbon atoms in the nuclear-substituted groups, in addition to the vinyl or alpha-methyl-vinyl, should not be greater than 12 and most frequently these alkyl substituents are methyl and/or ethyl.

These heterocyclic nitrogen bases have the formula

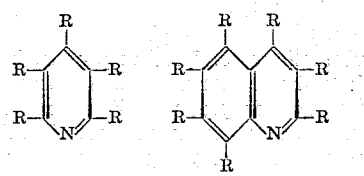

or

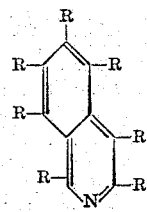

where R is selected from the group consisting of hydrogen, alkyl, vinyl, alpha-methylvinyl, alkoxy, halo, hydroxy, cyano, aryloxy, aryl, and combinations of these groups such as haloalkyl, alkaryl, hydroxyaryl, and the like; one and only one of these groups being selected from the group consisting of vinyl and alpha-methylvinyl; and the total number of carbon atoms in the nuclear substituted groups, in addition to the vinyl or alpha-methylvinyl group, being not greater than 12. Examples of such compounds are 2-vinylpyridine;
2-vinyl-5-ethylpyridine;
2-methyl-5-vinylpyridine;
4-vinylpyridine;
2,3,4-trimethyl-5-vinylpyridine;
3,4,5,6-tetramethyl-2-vinylpyridine;
3-ethyl-5-vinylpyridine;
2,6-diethyl-4-vinylpyridine;
2-isopropyl-4-nonyl-5-vinylpyridine;
2-methyl-5-undecyl-3-vinylpyridine;
2,4-dimethyl-5,6-dipentyl-3-vinylpyridine;
2-decyl-5-(alpha-methylvinyl)pyridine;
2-vinyl-3-methyl-5-ethylpyridine;
2-methoxy-4-chloro-6-vinylpyridine;
3-vinyl-5-ethoxypyridine;
2-vinyl-4,5-dichloropyridine;
2-(alpha-methylvinyl)-4-hydroxy-6-cyanopyridine;
2-vinyl-4-phenoxy-5-methylpyridine;
2-cyano-5-(alpha-methylvinyl)pyridine;
3-vinyl-5-phenylpyridine;
2-(para-methylphenyl)-3-vinyl-4-methylpyridine;
3-vinyl-5-(hydroxyphenyl)pyridine;
2-vinylquinoline;
2-vinyl-4-ethylquinoline;
3-vinyl-6,7-di-n-propylquinoline;
2-methyl-4-nonyl-6-vinylquinoline;
4-(alpha-methylvinyl)-8-dodecylquinoline;
3-vinylisoquinoline;
1,6-dimethyl-3-vinylisoquinoline;
2-vinyl-4-benzylquinoline;
3-vinyl-5-chloroethylquinoline;
3-vinyl-5,6-dichloroisoquinoline;
2-vinyl-6-ethoxy-7-methylquinoline;
3-vinyl-6-hydroxymethylisoquinoline;

and the like.

When copolymers are prepared, the diene component is generally present in a major portion by weight based on the monomers charged.

As previously stated, the alcohol treatment of the prior art is used in the present invention for the deactivation of the catalyst. This treatment results in the production of the corresponding alcoholate such as, for example, sodium methylate. The alcohol is normally used in an amount at least equivalent to that corresponding to the alkali metal present. Frequently as much as a 100 percent excess is used.

The next step involves treatment with a halide of calcium zinc, or iron, the addition of such a salt producing a precipitate which can be removed by filtration. Examples of these halides include calcium fluoride, calcium chloride, calcium iodide, calcium bromide, zinc chloride, zinc iodide, zinc bromide, ferrous chloride, ferric chloride, ferrous iodide, ferrous bromide, and ferric bromide. The more alcohol soluble salts give better results. Zinc chloride is preferred although excellent results are obtained with calcium chloride and both chlorides of iron. Zinc and iron chlorides are somewhat easier to use because the end point can be easily determined with pH paper, the easiest being the end point when using zinc chloride.

The precipitate formed when operating according to this invention, using zinc chloride as the salt and methyl alcohol as the alcohol, is a mixture of zinc methylate and sodium chloride.

*Example*

A liquid copolymer of 1,3-butadiene and 2-methyl-5-vinylpyridine was prepared using a monomer ratio of 85 parts by weight butadiene and 15 parts by weight of 2-methyl-5-vinylpyridine. This material was polymerized at a temperature of 185° F. and a pressure of 30 p.s.i.g. using finely divided sodium as the catalyst in an amount of approximately 1 weight percent based upon the monomers charged. Commercial grade normal heptane was used as the solvent in an amount to give an approximate 40 weight percent solution of the liquid polymer. Following polymerization, methyl alcohol was added in an amount to give a 100 percent excess based upon the sodium present.

Portions of the reaction zone effluent following treatment with methyl alcohol were treated with various metal salts in order to form the corresponding alcoholate. The various salts, the amounts used, filtration rates, and ash content of the product following removal of the solvent are shown in the following table. The filter used was a pressure filter having a filter area of three square inches and a pressure drop across the filter of 10 p.s.i.g. was maintained:

| Additive | g./lb. Effluent | Filtrate Volume ml. at Time Indicated, Seconds | | | | Ash Content, Wt. Percent |
|---|---|---|---|---|---|---|
| | | 100 | 300 | 900 | 1,800 | |
| None | | | 0.3 | 0.4 | 0.6 | 0.002 |
| FeCl₃·6H₂O | 9.5 | | 0.3 | 0.6 | 0.9 | 0.001 |
| FeCl₂ | (¹) | 0.5 | 0.9 | 1.7 | 2.7 | 0.018 |
| ZnCl₂ | 9.9 | | 0.6 | 1.4 | 2.1 | 0.058 |
| CaCl₂ | 10.5 | 0.5 | 1.0 | 2.2 | 3.7 | 0.031 |

¹ 32 grams of saturated solution of FeCl₂ in methyl alcohol.

In utilizing the metal halides of this invention, it is preferred to use an amount equivalent to the sodium or other alkali metal impurities present in the reactor effluent. A small excess, up to 10 percent can be used. A large excess should be avoided since it will increase the ash content of the final product. The treatment can be done at room temperature, although elevated temperatures as high as 200° F. can be used to speed up the treatment reaction.

As many possible embodiments can be made of this invention without departing from the scope thereof, it is to be understood that all matter herein set forth is to be interpreted as illustrative and not as unduly limiting the invention.

I claim:

1. A method for treating a liquid polymer produced by polymerization of a conjugated diene in the presence of an alkali metal catalyst and which contains alkali metal as an impurity, which comprises treating said liquid polymer with an alcohol and thereafter a halide of a metal selected from the group consisting of calcium, zinc, iron, and separating the resulting precipitate from said liquid polymer.

2. The method of claim 1 wherein said liquid polymer is a homopolymer of 1,3-butadiene.

3. The method of claim 1 wherein said liquid polymer is a copolymer of 1,3-butadiene and styrene.

4. The method of claim 1 wherein said liquid polymer is a copolymer of 1,3-butadiene and 2-methyl-5-vinylpyridine.

5. A method for treating a liquid polymer produced by polymerization of a conjugated diene in the presence of an alkali metal catalyst and which contains alkali metal as an impurity, which comprises treating said liquid polymer with methyl alcohol and thereafter zinc chloride, and separating the resulting precipitate from said liquid polymer.

6. A method for treating a liquid polymer produced by the solution polymerization of 1,3-butadiene and 2-methyl-5-vinylpyridine in the presence of a sodium polymerization catalyst and which contains sodium as an impurity, which comprises treating the polymerization zone effluent with methyl alcohol in an amount at least equal to that required to react with all sodium present, thereafter adding a halide of a metal selected from the group consisting of calcium, zinc, and iron, and separating the resulting precipitate from said liquid polymer.

7. The method of claim 6 wherein said metal halide is calcium chloride.

8. The method of claim 6 wherein said metal halide is zinc chloride.

9. The method of claim 6 said metal halide is ferrous chloride.

10. The method of claim is wherein said metal halide is ferric chloride.

References Cited in the file of this patent

UNITED STATES PATENTS

| | | |
|---|---|---|
| 2,813,136 | Mertz | Nov. 12, 1957 |
| 2,827,447 | Nowlin | Mar. 8, 1958 |

UNITED STATES PATENT OFFICE

CERTIFICATE OF CORRECTION

Patent No. 2,937,178                                May 17, 1960

Paul F. Warner

It is hereby certified that error appears in the printed specification of the above numbered patent requiring correction and that the said Letters Patent should read as corrected below.

Column 5, line 3, after "zinc," insert -- and --; column 6, line 12, after "claim 6" insert -- wherein --; line 14, for "is" read -- 6 --.

Signed and sealed this 29th day of November 1960.

(SEAL)
Attest:

KARL H. AXLINE
Attesting Officer

ROBERT C. WATSON
Commissioner of Patents